J. A. TAYLOR.
COMBINED BRAKING, DRIVE CLUTCH, AND MOTOR STARTING MECHANISM.
APPLICATION FILED DEC. 16, 1914.
1,301,018.                                                      Patented Apr. 15, 1919.
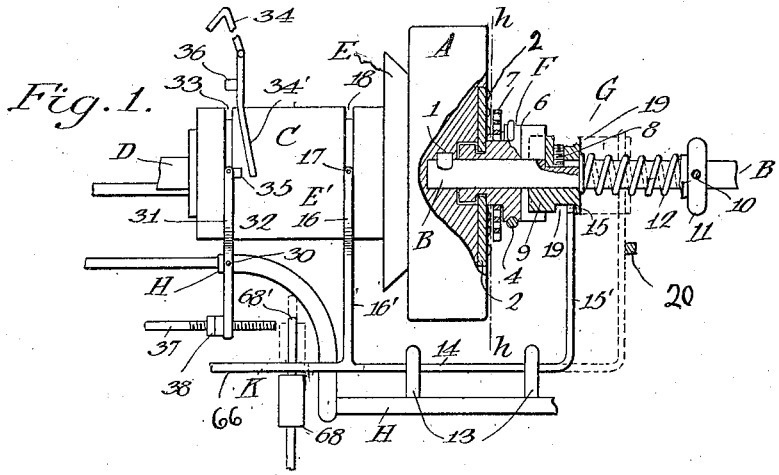
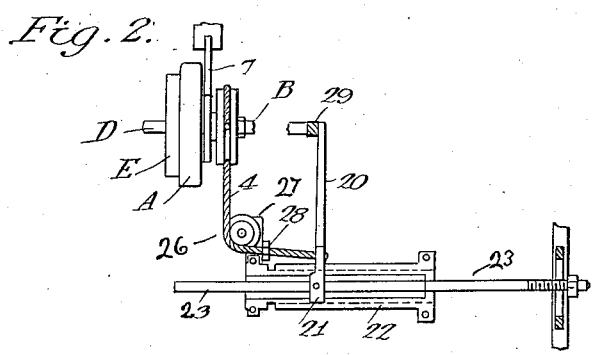
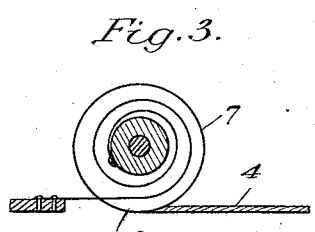
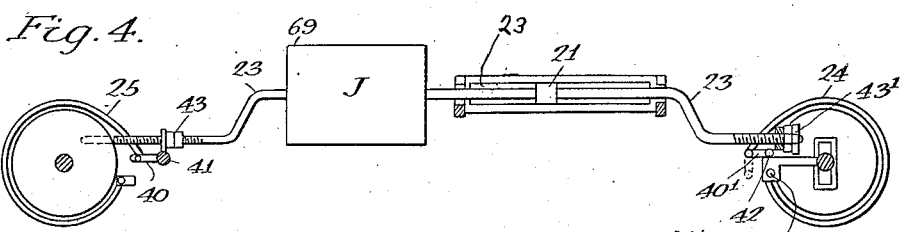
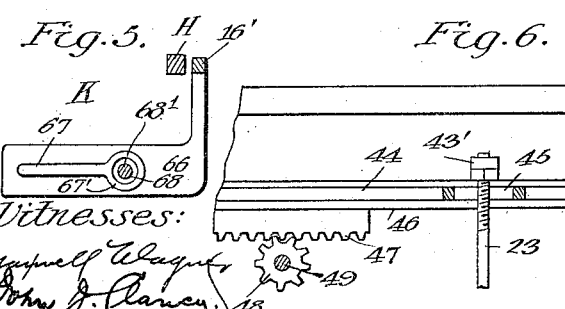
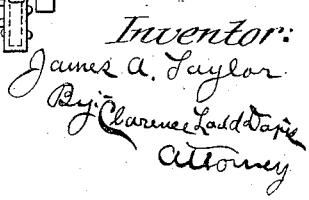

UNITED STATES PATENT OFFICE.

JAMES A. TAYLOR, OF NEW YORK, N. Y.

COMBINED BRAKING, DRIVE-CLUTCH, AND MOTOR-STARTING MECHANISM.

1,301,018.  Specification of Letters Patent.  Patented Apr. 15, 1919.

Original application filed July 14, 1911, Serial No. 638,572. Divided and this application filed December 16, 1914. Serial No. 877,538.

*To all whom it may concern:*

Be it known that I, JAMES A. TAYLOR, a citizen of the United States, residing at the borough of Manhattan, in the county, city, and State of New York, have invented certain new and useful Improvements in Combined Braking, Drive-Clutch, and Motor-Starting Mechanisms, of which the following is a specification, this application being a divisional application of my original application, for this and other inventions, Serial No. 638,572, filed July 14, 1911.

The objects of my invention are to provide; (1), a power braking device for use in road vehicles of the automobile type of a new and improved form, (and usually simultaneously braking all the traction or supporting wheels of the vehicle); (2) to so connect the braking mechanism with the drive-clutch that it will be thrown out of clutch upon the initial movement of the braking mechanism, and before the brake is set; and (3) to so combine such brake and clutch mechanism with a motor-starting mechanism (preferably of the improved form of my invention shown) in such manner that the power mechanism when moved in one direction will actuate the motor-starter, and when reversely moved will set the brakes and throw out the drive clutch.

To the before mentioned ends my said invention comprises in the main and broadly, a main or motor crank-shaft; a drive-shaft; two drive-clutch members adapted to bring such shafts into and out of operative connection; a motor-starting mechanism carried by the main or crank-shaft, comprising a clutch-member reciprocating on and rotating with the crank-shaft, coacting with a clutch-member revolubly mounted on the crank-shaft; means for reciprocating the reciprocating clutch-member; means for forming a yielding contact between such clutch-members; mechanism connecting the drive-clutch and starter-clutch in such manner that when one is fully in clutch the other will be fully out; means actuated by the driver for throwing the drive-clutch out without throwing the starter-clutch in; mechanism actuated upon the throwing of the shift-gears to neutral for automatically throwing the drive-clutch out without throwing the starter-clutch in; a braking mechanism; power mechanism controlled by the driver which when moved in one direction will actuate the motor-starter and when in the other will set the brakes; means for automatically returning the rotating member of the starter-clutch to the normal position upon release of the power; a like means for throwing the brakes to release; means for locking the drive-clutch against being thrown into clutch while the starter mechanism is being operated; means for automatically throwing the drive-clutch locking mechanism to release upon the throwing in of a shift-gear; and mechanism connecting and combining all such described mechanism into a concrete whole in such manner, that no mechanism can by its operation injure another; although I do not limit myself to the exact construction, nor combination herein shown, either in whole, or in any of the parts thereof.

My said invention is fully shown and described in the following specification, of which the accompanying drawing forms a part, wherein similar letters or numerals of reference designate like or equivalent parts wherever found throughout the several views; and in which:—

Figure 1, is a side-view partially in section, of the combined drive-clutch, and motor-starting mechanism of the form I prefer to embody the same, showing its connection with the power, and gear neutralizing mechanism;

Fig. 2, is a top-view, on a somewhat smaller scale, of the starter mechanism shown at the right of Fig. 1, showing the actuating piston-rod, etc., Fig. 3, is a diagrammatic side view, partially in section of the starter-cable, drum, retracting-spring, etc., looking toward the right of Figs. 1 and 2;

Fig. 4, is a diagrammatic side-view of the four wheel braking mechanism, slide-way, etc., showing the power cylinder, piston-rod, etc.;

Fig. 5, is a top-plan view of the locking mechanism for locking the drive-clutch in the non-clutching position, upon the initial movement of the braking mechanism to brake setting; and Fig. 6, is a top-plan view of the right side portion of the forward braking mechanism, connected with the forward vibrating steering wheels.

Referring to the drawing:—

Therein A, indicates the fly-wheel, which is rigidly secured to the end of the motor main or crank-shaft B, (usually by a key 1) so as to rotate in unison with such shaft B. The fly-wheel, coacts with the other and moving member C, of the drive-clutch, for forming the required connection between the main-shaft B, and drive-shaft D, which latter is in actuating connection at its rear end with the master-wheel, of the speed, and reverse-gear wheel mechanism (not shown).

While any form of clutch may be used as a drive-clutch, I prefer to use the one shown, consisting of the cone E, formed integral with the rear sleeve-portion E', and keyed to the drive-shaft D, so as to reciprocate thereon, in the well known manner.

The fly-wheel A, is provided on its front face with a cylindrical chamber surrounding the crank-shaft B, which is closed by a two-part split-plate 2, having a central orifice so as to prevent the starter-sleeve F, from slipping outward by reason of having its inner edges located in the peripheral retaining groove thereof, as clearly shown in Fig. 1; the split-plate 2, being usually secured in place by suitable screws 2'.

The starter-sleeve is rotated in the motor starting direction by the starter-cable 4, fitting in a groove on the larger periphery of such sleeve F, and secured at the end thereto; and is retracted to normal position by the coil-spring 7. Such sleeve F, carries on its outer face the crown-toothed ratchet-wheel 6, coacting with a similar crown-toothed ratchet-wheel 9, on the rear face of the reciprocating starter-clutch member or sleeve G, to form a yielding spring ratchet-clutch; the member G, being secured to the shaft B, by a set-screw 10, the end of which fits into a slot formed longitudinally of the shaft B, in such manner that the two will rotate together, and the member G, being normally forced toward its coacting member F, by a pressure-spring 12, interposed between such member and the stop-collar 11.

The reference letter H, designates a bracket, rigidly secured to the main-frame of the vehicle, having journal-studs 13, in which is reciprocatingly mounted the slide-bar 14, having at one end the shift-fork 15, and at the other the like shift-fork 16, having the shift-pins or studs 17, projecting into the peripheral shift-grooves 18 and 19, in the member C, of the drive-clutch, whereby when the starter clutch is in the drive-clutch will be out, and vice versa. That is, that while both clutches may be thrown out at the same time, it is made utterly impossible to throw one in without throwing the other completely out. And in order that the starter-clutch members may be automatically disengaged as the motor is started, the slot 19, is made much wider than the fork-pins, whereby the clutch will slip against the resiliency of the spring 12.

As shown in Figs. 2 and 4, the starter-cable 4, is secured at its outer end to a rod or stud 20, formed integral with a slide-block or gib 21, reciprocating in the slide-way of the slide-way frame 22, supported by the chassis or frame of the vehicle. Such slide-block or gib 21, is rigidly secured to the piston-rod 23 actuated by a piston (not shown) reciprocating in the fluid-pressure power cylinder J, whereby, by manipulation of the proper key or keys (not shown), controlling the entrance and exhaust of the compressed-air, or other actuating pressure-fluid into and out of same, such piston-rod 23, will be forced to the front (toward the right of Figs. 2 and 4,) to actuate the starter mechanism, and toward the rear (or left) to throw the brakes to set; the piston being kept normally in the central and neutral position, ready to be moved in either direction, by the natural resiliency of the steel strap-brakes 24, and 25; though when other than strap-brakes are used a special spring device may be used for such purpose.

The starter-cable 4, passes to the starter-clutch vibrating-member 6, by way of the idler-pulley 26, secured upon a side extension or bracket 27, of the slide-way frame 22, and secured upon such starter-cable is a stop-collar 28, abutting against the forward face of the bracket 27, to prevent destructive excessive retractive action when returning to the normal position, by the coil-spring 7, upon release from the power; and formed integral with, or secured to the slide-block or gib 21, is a shift-rod 20, abutting against the stem-rod 15', of the starter-clutch fork 15, so as to just throw out the drive-clutch member C, when the piston-rod 23, is moved to the rear (or left of the drawing) just far enough to also set the brakes, but without bringing into clutch the reciprocating starter-clutch member, G.

Pivoted to the bracket H, by means of a pivot-bolt 30, is a shift-fork 31, having shift-pins 32, projecting into the peripheral shift-slot 33, of E', so as to release the drive-clutch, when the top-fork portion of the shift-fork 31, is moved to the rear (or left of Fig. 1); and in order that the driver may do this in the well known manner by pressure upon the usual foot-lever 34, such lever is provided with a lower portion 34', bent as shown, so as to throw back the fork 31, by abutment against the throw-stud 35, thereof; but this movement while sufficient to release the drive-clutch will not throw in the starter-clutch, as the consequent movement is limited by abutment of 34, against the stop-stud 36.

Abutting against the lower end of the vibrating shift-fork lever 31, is the throw-out rod 37, having the adjustable stop-nuts 38, screwed upon the same, by which the movement of the lever 31, may be regulated as desired; so that upon the forward movement of such throw-out rod 37, to the front (right of drawing) the drive-clutch C, will be thrown out, but the starter-clutch G, will not be thrown in; and this happens automatically every time the shift-gears (not shown) are thrown to neutral by the neutralizing shift-gear mechanism, whereupon such rod 37, is automatically locked in such extreme forward position so as to lock the drive-clutch in release, until such time as the throwing of any of the shift-gears into mesh will release the rod-locking mechanism, whereupon the drive-clutch, in the manner common to such clutches, will be thrown inward into the clutching position, and at the same time such inward movement of such clutch will throw such throw-out rod 37 to its normal position.

As shown in Fig. 4, at 24 and 25, the braking mechanism is usually and preferably of such form as to simultaneously brake all the supporting wheels of the vehicle; and this is usually accomplished by connecting the piston-rod, actuated from the power-cylinder J, from any convenient fluid pressure supply, usually compressed air drawn from a supply-tank (not shown), in which the pressure is maintained by a suitable air-pump actuated by the motor, with such strap-spring brakes 24 and 25, usually through the intervention of levers 40 and 40', rigidly secured to their respective rock-rods 41 and 42, so as to form a bell-crank lever action for throwing the brakes to set, when the piston-rod 23, is thrown to the rear or left of drawing; the extent of such throw being limited and regulated by the stop-nuts 43 and 43'.

In order that the front or steering-wheels (Figs. 4 and 6,) may have their brakes properly set irrespective of the traverse of such wheels, the vibrating brake-rod 44, is provided with an elongated slot 45, in a lever extension thereof, through which passes the end of the combined piston and brake-rod 23, carrying the stop-nuts 43', for throwing the brakes to set; whereby, while the steering-wheels are free to be vibratorily swung, in the well known manner by manipulation of the handwheel (not shown) vibrating the steering-wheel shaft 49, having the gear-wheel 48, meshing with the rack-gear 47, secured to the reciprocating transverse steering-rod 46, the brake may be set at all times, irrespective of the change of wheel position.

If the starter-mechanism should be actuated when the starter clutches are out of mesh, this would be liable to wreck such mechanism, and to obviate this I prefer to provide a suitable locking mechanism; such for instance as that shown at K, (Figs. 1 and 5) which prevents the pressure fluid from being allowed to enter the cylinder J, on the left or starter actuating side, save when such starter clutch is in mesh. This locking mechanism may be of many forms, but that shown will be found efficient.

In the embodiment of my improved locking mechanism (as shown in Figs. 1 and 5,), a bracket-piece or plate 66, is formed integral with or secured to the standard 16', of the shift-fork 16, and is provided with a narrow-slot 67, having at its forward end, (right of Figs. 1 and 5), the enlarged lock-slot or orifice 67', usually of the circular form shown, but at any rate of the same shape and diameter of the enlarged lower lock-portion 68, formed integral with an upper slide-pin portion 68', the too together forming a lock-pin L, which, when in the normal lower position shown in the drawing will have in the slide-way composed of the circular-lock portion 67', and narrow slide-slot 67, only the upper slide-pin 68', of the lock-bolt composed of same and the locking portion 68, so as to allow of reciprocation of the bracket K, and its attached bar 14, but the lock-bolt L, is connected with the key admitting the pressure-fluid to the starter side (left of drawing) of the cylinder J, (neither key nor mechanism shown), in such manner that upon the actuation of such key by the driver, in its initial movement, and before the opening of the valve so as to actuate the piston-rod 23 toward the front and right of the drawing, such initial key movement will have thrown such lock-pin up into the enlarged portion 67' of the lock-slot, thus locking the starter-clutch in, save for the yield of the spring 12; after which continued movement of the key will open the valve as the lock-pin moves farther upward, when the starter clutch will be rotated; and it will be seen that except when the clutch of the starter-mechanism is fully in and the drive-clutch is out can the lock-pin L be forced sufficiently far upward to admit pressure-fluid to the cylinder J, so as to rotate the starter mechanism.

As neither the supporting traction-wheels, nor the brake and starter controlling mechanisms, operated and controlled by the driver of the vehicle, are necessarily of any particular form, and inasmuch as it is self-evident that some such wheels or controlling mechanisms must of necessity be used; and can be applied by any high class mechanician skilled in the art, I have not deemed it essential to fully describe, in the specification, or set forth in the drawing herein, the actual mechanism or connections, and operative parts thereof; and neither have I deemed it essential to include them as elements of the claim, inasmuch as my invention herein disclosed would of necessity have to be in operative connection therewith, while not having the same included therein, but only a priori subsidiary to the proper operation of such invention.

Inasmuch as the particular mechanisms described as "not shown," are more specifically described in the original application, or in another divisional application thereof, filed simultaneously herewith, I have not deemed it essential to more fully show or describe the same herein; as the specific constructions thereof are fully set forth in such other applications, original or divisional; and therein specifically claimed.

I claim:—

1. In a wheeled vehicle, a motor-starter mechanism; a constantly rotating motor-shaft; a drive-shaft; a clutch for connecting the motor and drive-shafts; braking-mechanism for braking the vehicle; and power actuated mechanism operating the brake, motor-starter and clutch-mechanisms, whereby the initial movement thereof toward the braking position automatically throws out the clutch connecting the motor and drive-shafts.

2. In a vehicle, a constantly rotating motor-shaft; a drive-shaft; a clutch for connecting the motor and drive-shafts; braking mechanism power-mechanism for actuating the braking-mechanism; and mechanism operated by the power means for throwing the clutch out upon the initial movement of the power means to actuate the braking mechanism.

3. In a device of the class described, a reciprocating shaft; braking mechanism normally in the non-braking position thrown to set upon the movement of the shaft in one direction; a motor-starter actuated upon the movement of the reciprocating shaft in the direction opposite to its brake-setting movement; and power means for actuating the shaft in either direction.

4. In a device of the class described, a combined motor-starting and braking mechanism adapted to give an initial starting movement to the motor when moved in one direction, and to set the vehicle brakes when moved in another direction; and means for normally maintaining both starter and brake mechanisms in the neutral and non-working positions.

5. In a device of the class described; a braking mechanism comprising a main-axle; a knuckle-joint steering-axle vibratorily secured to the main-axle at either end; a steering-bar extending longitudinally of the main-axle; connecting the knuckle-joint steering-axles adapted to simultaneously vibrate the same so as to steer the vehicle; a brake for each wheel; a brake-rod extending longitudinally of the steering-bar in actuating connection at either end with the brakes; a motor-starter; and power means for setting the brakes by movement of the same in one direction; and for actuating the motor-starter by movement in another direction.

Signed at the borough of Manhattan, city, county and State of New York this 12th day of December, 1914.

JAMES A. TAYLOR.

Witnesses:
JAMES CHRISTIE,
MAXWELL WAGNER.

Copies of this patent may be obtained for five cents each, by addressing the "Commissioner of Patents, Washington, D. C."